United States Patent
Guo et al.

(10) Patent No.: US 12,078,855 B1
(45) Date of Patent: Sep. 3, 2024

(54) OPTICAL SIGNAL TRANSMISSION DEVICE

(71) Applicant: BLOVELIGHT (GUANGDONG) INTELLIGENT TECHNOLOGY CO., LTD, Guangdong (CN)

(72) Inventors: Dawei Guo, Hubei (CN); Wei Zhao, Sichuan (CN)

(73) Assignee: BLOVELIGHT (GUANGDONG) INTELLIGENT TECHNOLOGY CO., LTD, Dongguan (CN)

( * ) Notice: Subject to any disclaimer, the term of this patent is extended or adjusted under 35 U.S.C. 154(b) by 0 days.

(21) Appl. No.: 18/400,876

(22) Filed: Dec. 29, 2023

(30) Foreign Application Priority Data

Dec. 7, 2023 (CN) .......................... 202311673748.3

(51) Int. Cl.
*G02B 6/42* (2006.01)
*G02B 1/04* (2006.01)
*G02B 6/36* (2006.01)

(52) U.S. Cl.
CPC .............. *G02B 6/425* (2013.01); *G02B 1/04* (2013.01); *G02B 6/3644* (2013.01); *G02B 6/4206* (2013.01); *G02B 6/4239* (2013.01); *G02B 6/428* (2013.01)

(58) Field of Classification Search
CPC ...... G02B 6/425; G02B 6/3644; G02B 6/428; G02B 6/4206; G02B 6/4239; G02B 1/04
See application file for complete search history.

(56) References Cited

U.S. PATENT DOCUMENTS

2015/0086162 A1* 3/2015 Miyahara ........... G02B 23/2446
385/33

OTHER PUBLICATIONS

Lin, CN 105334586, Feb. 2016 (Year: 2016).*

* cited by examiner

*Primary Examiner* — Mary Ellen Bowman

(57) ABSTRACT

The present disclosure discloses an optical signal transmission device, which includes a light-transmitting body. The front end of the light-transmitting body is provided with a plurality of lenses. The rear end of the light-transmitting body is provided with a plurality of optical fiber holes. Optical fibers are inserted into the optical fiber holes. The optical fiber holes extend towards the interior of the light-transmitting body, and the optical fiber holes are aligned with the lenses one by one. The front side of the light-transmitting body is provided with a plurality of light-emitting chips, and emission ends of the light-emitting chips are aligned with the lenses one by one.

6 Claims, 2 Drawing Sheets

OPTICAL SIGNAL TRANSMISSION DEVICE

CROSS-REFERENCE TO RELATED APPLICATION

This application claims priority from the Chinese patent application 2023116737483 filed Dec. 7, 2023, the content of which is incorporated herein in the entirety by reference.

TECHNICAL FIELD

The present disclosure relates to optical fiber communication devices, and in particular to an optical signal transmission device.

BACKGROUND ART

In the prior art, referring to FIG. 4, a common optical module emitting device uses an EML chip to emit light, the light is focused to an FA optical fiber end face through a lens, and the front end of the FA optical fiber end face is bonded with an optical isolator, which has a complex structure and process and a high cost. FA optical fibers require two pieces of processed glass to press multiple optical fibers tightly, which are then fixed with glue. Then, an inclined surface is ground into an optical surface, and the optical isolator is bonded to the two pieces of processed glass, which are then coupled to a PCBA board together with the lens. Although this type of structure can realize optical signal transmission, it still has the following defects: firstly, if the existing optical design is made into a high-speed finished optical module, it is necessary to add an optical isolator, which is not only complicated in structure, but also the entire link requires multiple couplings to achieve the purpose of communication, and once an abnormality occurs, the repair cost will be high; secondly, the existing design has a large spot size, resulting in extremely small coupling tolerance, high process requirements, and low production yield; in addition, the existing structure requires two pieces of processed glass to press multiple optical fibers tightly, which are then fixed with glue, and then ground, which is a complex process and has a high manufacturing cost.

SUMMARY

The technical problem to be solved by the present disclosure is to provide an optical signal transmission device that has a simple structure, is easy to manufacture, simplifies optical paths, and can reduce the bit error rate, in view of the deficiencies of the prior art.

In order to solve the above technical problem, the present disclosure uses the following technical solution.

An optical signal transmission device comprises a light-transmitting body, wherein the front end of the light-transmitting body is provided with a plurality of lenses, the rear end of the light-transmitting body is provided with a plurality of optical fiber holes, optical fibers are inserted into the optical fiber holes, the optical fiber holes extend towards the interior of the light-transmitting body, the optical fiber holes are aligned with the lenses one by one, the front side of the light-transmitting body is provided with a plurality of light-emitting chips, and emission ends of the light-emitting chips are aligned with the lenses one by one.

Preferably, the light-transmitting body is made of plastic material.

Preferably, a first bevel portion is formed at the bottom of the optical fiber hole, a second bevel portion is formed at the front end of the optical fiber, bevel portion, and the first bevel portion and the second bevel portion are arranged oppositely with a gap between them.

Preferably, a wide-mouthed portion is provided at the rear end opening of the optical fiber hole.

Preferably, the rear end of the light-transmitting body is provided with a stepped opening, the optical fibers pass through the stepped opening, and the stepped opening is filled with fixing glue.

Preferably, the device further comprises a PCB board, and the light-transmitting body is fixed on the PCB board.

Preferably, a chip substrate is fixed on the PCB board, the chip substrate is located on the front side of the light-transmitting body, and the plurality of light-emitting chips are all fixed on the chip substrate.

In the optical signal transmission device disclosed in the present disclosure, the light-transmitting body is an integral component, with a plurality of lenses at its front end, a plurality of optical fiber holes at its rear end, and a plurality of optical fibers inserted into the plurality of optical fiber holes respectively, which are aligned with the lenses one by one. Optical signals emitted by the light-emitting chips pass through the lenses respectively, and then enter the optical fibers through the light-transmitting body for signal transmission. Compared with the prior art, the present disclosure does not require the installation of upper and lower glass sheets, nor does it require the installation of components such as optical isolators and independent lenses, greatly simplifying the product structure and avoiding the problem of high error rate caused by optical signals passing through multiple independent components. In addition, the device of the present disclosure is easy to manufacture and assemble, which can reduce product cost and manufacturing cost.

DETAILED DESCRIPTION OF EMBODIMENTS

Figure 1:
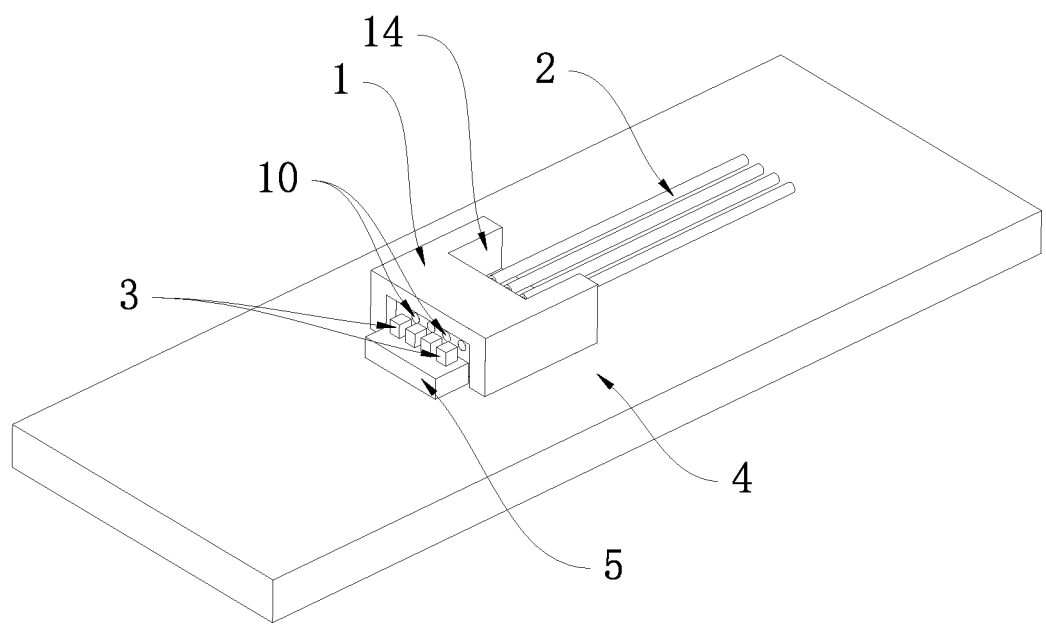
FIG. 1 is a first three-dimensional view of an optical signal transmission device according to the present disclosure.

The following describes the present disclosure in more detail with reference to the drawings and embodiments.

The present disclosure discloses an optical signal transmission device. As shown in conjunction with FIGS. 1 to 3, it includes a light-transmitting body 1. The front end of the light-transmitting body 1 is provided with a plurality of lenses 10. The rear end of the light-transmitting body 1 is provided with a plurality of optical fiber holes 11. Optical fibers 2 are inserted into the optical fiber holes 11. The optical fiber holes 11 extend towards the interior of the light-transmitting body 1, and the optical fiber holes 11 are aligned with the lenses 10 one by one. The front side of the light-transmitting body 1 is provided with a plurality of light-emitting chips 3, and emission ends of the light-emitting chips 3 are aligned with the lenses 10 one by one.

In the above structure, the light-transmitting body 1 is an integral component, with a plurality of lenses 10 at its front end, a plurality of optical fiber holes 11 at its rear end, and a plurality of optical fibers 2 inserted into the plurality of optical fiber holes 11 respectively, which are aligned with the lenses 10 one by one. Optical signals emitted by the light-emitting chips 3 pass through the lenses 10 respectively, and then enter the optical fibers 2 through the light-transmitting body 1 for signal transmission. Compared with the prior art, the present disclosure does not require the installation of upper and lower glass sheets, nor does it require the installation of components such as optical isolators and independent lenses, greatly simplifying the product structure and avoiding the problem of high error rate caused by optical signals passing through multiple independent components. In addition, the device of the present disclosure is easy to manufacture and assemble, which can reduce product cost and manufacturing cost.

As a preferred material, the light-transmitting body 1 is made of plastic material. In this embodiment, it is preferable to use an integrated light-transmitting body made of plastic material, which can avoid problems such as low assembly efficiency and insufficient assembly accuracy caused by the superposition of two pieces of glass.

In this embodiment, a first bevel portion 12 is formed at the bottom of the optical fiber hole 11, and a second bevel portion 20 is formed at the front end of the optical fiber 2. The first bevel portion 12 and the second bevel portion 20 are arranged oppositely with a gap between them. The inclination angle of the second bevel portion 20 is 6° to 10°, and the first bevel portion 12 is arranged opposite to it at a matching inclination angle. The gap between the two bevel portions can prevent part of the light from reflecting back to the light emitting chip 3 along the first slope portion 12, thereby reducing the bit error rate.

Figure 3:
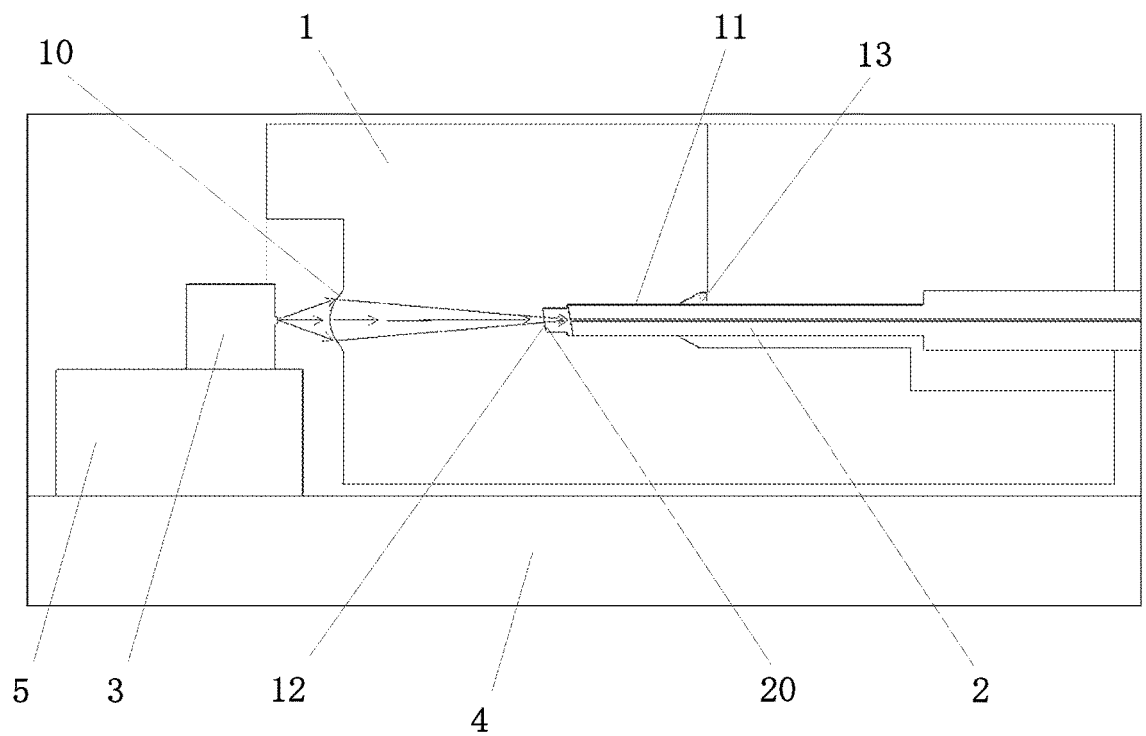
FIG. 3 is a cross-sectional view of the optical signal transmission device according to the present disclosure.
Figure 4:
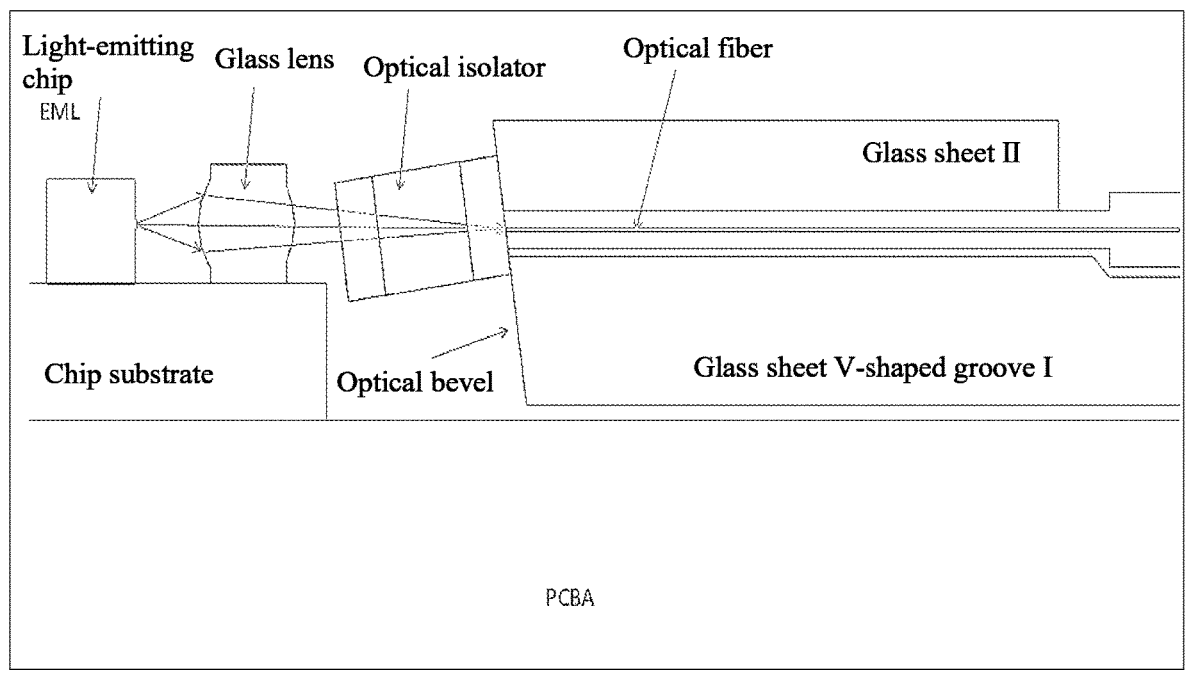
FIG. 4 is a cross-sectional view of an existing optical signal transmission device.

Referring to FIG. 3, further, a wide-mouthed portion 13 is provided at the rear end opening of the optical fiber hole 11. The wide-mouthed portion 13 facilitates the insertion of the optical fiber 2 into the optical fiber hole 11.

Figure 2:
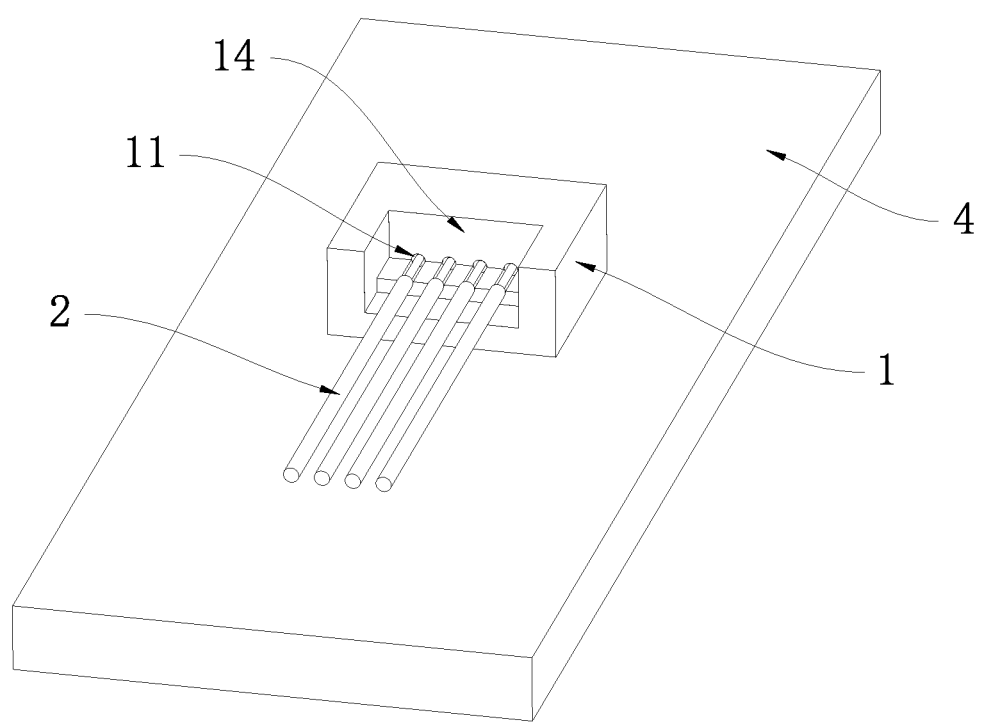
FIG. 2 is a second three-dimensional view of the optical signal transmission device according to the present disclosure.

In this embodiment, referring to FIGS. 1 and 2, the rear end of the light-transmitting body 1 is provided with a stepped opening 14, the optical fibers 2 pass through the stepped opening 14, and the stepped opening 14 is filled with fixing glue. Specifically, the plurality of optical fibers 2 are bonded and fixed by using the fixing glue filled in the stepped opening 14.

On this basis, this embodiment also includes a PCB board 4, and the light-transmitting body 1 is fixed on the PCB board 4. The PCB board 4 mainly serves as a support, fixation, and electrical connection.

In order to facilitate the installation and fixation of the plurality of light-emitting chips 3, in this embodiment, a chip substrate 5 is fixed on the PCB board 4, the chip substrate 5 is located on the front side of the light-transmitting body 1, and the plurality of light-emitting chips 3 are all fixed on the chip substrate 5.

In practical applications, this embodiment can be made into a DR4 optical module with 4 cores and a spacing of 0.25 mm/0.5 mm/0.75 mm/1.0 mm; or a DR8 optical module with 8 cores and a spacing of 0.25 mm/0.5 mm/0.75 mm; or an SR4 optical module with 12 cores*0.25 mm spacing (4 receiving and 4 transmitting optical module); or an SR8 optical module with 12 cores*0.25 mm spacing (8 receiving and 8 transmitting optical module, using two integrated plastic lenses); or a non-standard custom designed optical module with any number of cores and any spacing, and no limit to the number of transmitting and receiving cores.

The above embodiments are merely preferred embodiments of the present disclosure but not intended to limit the present disclosure, and any modifications, equivalent replacements, improvements, etc. made within the technical scope of the present disclosure should be included within the scope of protection of the present disclosure.

The invention claimed is:

1. An optical signal transmission device, comprising a light-transmitting body (1), wherein the front end of the light-transmitting body (1) is provided with a plurality of lenses (10), the rear end of the light-transmitting body (1) is provided with a plurality of optical fiber holes (11), optical fibers (2) are inserted into the optical fiber holes (11), the optical fiber holes (11) extend towards the interior of the light-transmitting body (1), the optical fiber holes (11) are aligned with the lenses (10) one by one, the front side of the light-transmitting body (1) is provided with a plurality of light-emitting chips (3), and emission ends of the light-emitting chips (3) are aligned with the lenses (10) one by one; and a first bevel portion (12) is formed at the bottom of the optical fiber hole (11), a second bevel portion (20) is formed at the front end of the optical fiber (2), and the first bevel portion (12) and the second bevel portion (20) are arranged oppositely with a gap between them.

2. The optical signal transmission device of claim 1, wherein the light-transmitting body (1) is made of plastic material.

3. The optical signal transmission device of claim 1, wherein a wide-mouthed portion (13) is provided at the rear end opening of the optical fiber hole (11).

4. The optical signal transmission device of claim 1, wherein the rear end of the light-transmitting body (1) is provided with a stepped opening (14), the optical fibers (2) pass through the stepped opening (14), and the stepped opening (14) is filled with fixing glue.

5. The optical signal transmission device of claim 1, further comprising a PCB board (4), wherein the light-transmitting body (1) is fixed on the PCB board (4).

6. The optical signal transmission device of claim 5, wherein a chip substrate (5) is fixed on the PCB board (4), the chip substrate (5) is located on the front side of the light-transmitting body (1), and the plurality of light-emitting chips (3) are all fixed on the chip substrate (5).

* * * * *